(12) United States Patent
Hellstén et al.

(10) Patent No.: US 7,146,645 B1
(45) Date of Patent: Dec. 5, 2006

(54) DEDICATED APPLICATIONS FOR USER STATIONS AND METHODS FOR DOWNLOADING DEDICATED APPLICATIONS TO USER STATIONS

(75) Inventors: Harri Hellstén, Tampere (FI); Kari Kivisto, Oulunsalo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/475,359

(22) Filed: Dec. 30, 1999

(51) Int. Cl.
*H04L 9/00* (2006.01)

(52) U.S. Cl. .............................. 726/33; 726/22; 726/29

(58) Field of Classification Search ................ 713/201; 726/26, 29, 33
See application file for complete search history.

(56) References Cited

U.S. PATENT DOCUMENTS

| | | | |
|---|---|---|---|
| 4,866,769 A | 9/1989 | Karp | |
| 5,103,476 A * | 4/1992 | Waite et al. | 705/59 |
| 5,533,124 A | 7/1996 | Smith et al. | |
| 5,835,911 A | 11/1998 | Nakagawa et al. | |
| 5,845,090 A | 12/1998 | Collins, III et al. | |
| 5,894,516 A * | 4/1999 | Brandenburg | 705/51 |
| 5,935,246 A | 8/1999 | Benson | |
| 5,978,833 A * | 11/1999 | Pashley et al. | 709/200 |
| 6,014,561 A * | 1/2000 | Molne | 455/419 |
| 6,063,134 A | 5/2000 | Peters et al. | |

* cited by examiner

*Primary Examiner*—Gilberto Barrón, Jr.
*Assistant Examiner*—Jacob Lipman
(74) *Attorney, Agent, or Firm*—Ware, Fressola, Van Der Sluys & Adolphson LLP

(57) ABSTRACT

The present invention is directed to a copy-protected dedicated software application and methods for downloading copy-protected dedicated applications to user stations so that the unique dedicated applications are executable upon downloading to the user station and so that the unique dedicated applications will only run on that particular authorized user station. A method of downloading the unique dedicated applications directly from a distributor to the user station is also included which eliminates the need for contact between the original manufacturer of an application and the user station.

19 Claims, 4 Drawing Sheets

DEDICATED APPLICATIONS FOR USER STATIONS AND METHODS FOR DOWNLOADING DEDICATED APPLICATIONS TO USER STATIONS

FIELD OF THE INVENTION

This invention relates in general to the field of user stations including, but not limited to, mobile phones and personal computers, and more precisely, to methods of downloading applications such as software to user stations or user equipment such as mobile stations, personal computers, smart phones and/or communicators.

BACKGROUND OF THE INVENTION

In the future, many types of applications including software will be downloadable to user stations such as mobile stations, personal computers and cellular phones in a manner that is largely unnoticeable to the user because the applications will be automatically downloadable and executable, and will require no special effort by the user to load and execute. This will be possible while also preserving copy-protection measures of the application and while also automatically routing billing information to appropriate authorities. Therefore, the user will simply place an order for an application, and all other steps will be performed automatically. This is roughly comparable to the present computer software business wherein it is possible to download executable applications from the Internet for example. However, there is a great problem with software piracy in the traditional software industry. The present invention is directed towards preventing illegal use of applications for user stations such as mobile stations and personal computers and is also directed towards the direct delivery and distribution of executable applications directly to the user of the user stations.

More specifically, in reference to the prior art, it is known to use copy protection of personal computer (PC) software distributed on diskettes by providing a unique identification code (ID) stored in read only memory (ROM) of a personal computer in which the software on the diskette is to be used. This personal computer ID is accessible to the user of the computer. A vendor who wishes to protect his diskette-distributed software from illegal copying or use provides a source ID on the diskette. The personal computer ID is used with the source ID on the distributed diskette to produce an encoded check word, using any available encryption modality. The check word is generated and written onto the distributed diskette during installation and copies onto all backup versions made by the user's personal computer. Prior to each use of the program, the software on the diskette uses the personal computer and the source IDs and check word to verify that the software is being used on the same personal computer on which it was installed. A disadvantages of this method is reliance upon physically sending a disk to the user from the vendor. Another disadvantage of this method is the possibility that the application may be copied before it is installed, and before a check word is created. Additionally, the check word can be easily located, if it is separated from the application.

It is also known to use a copy protection mechanism for protecting software against copying, consisting of a challenge mechanism embedded in each protected item of software. The challenge mechanism has no access to the customer's private keying material. In operation, the challenge mechanism sends a random challenge to the customer's signature server. The signature server signs the challenge, using the customer's private keying material and them returns the signed challenge to the challenge mechanism. The challenge mechanism then verifies the signed challenge, using the customer's public keying material, and prohibits the customer from using some or all of the protected item of software unless the verification is successful. The mechanism permits every customer to receive an identical copy of the copy protected program with the embedded challenge mechanism. The disadvantages of this method include not sending a specifically dedicated version of the software to the customer, but rather the customer receives a template version which will function with many different codes making it easier to violate the copy-protection.

In regard to mobile phones and cellular communications in general, it is known to download copy-protected software applications to the mobile station from a server via a wireless network. However, any required unlocking codes are not provided automatically in the art, but rather require the user to make a separate contact or transaction with the manufacturer to receive the unlocking codes. Then, the user must install the unlocking codes in the software application and/or mobile station. These steps are time consuming and inconvenient for users. Wireless mobile station users also do not like to spend relatively long periods of time accessing wireless networks due to battery limitations of mobile stations, fees associated with air time, and potential for connections being dropped during downloading. Therefore, there is a need for timely and convenient downloading and verification processes which do not require active, difficult, or time consuming, user participation. Therefore, from a user's point of view, the capability to run a new application immediately after downloading is of paramount importance.

It is also known to use a method for checking the compatibility of a mobile station and a functional unit such as an application. A reference code is calculated in the mobile station and the functional unit by using algorithms which use initial numbers given by the mobile station, and the results are compared in the mobile station. On the basis of the comparison it is concluded, whether or not to activate the functional unit. In order to carry out the check measures, a check message including preferably name of the mobile station manufacturer/agent International Mobile Station Equipment Identity (IMEI) code, the product code, the version data, and a random number, is transmitted to the functional unit. Then a response message including preferably name of the functional unit manufacturer/agent, serial number, text message indicated by the functional unit, version data, and reference code, is transmitted from the functional unit to the mobile station. The disadvantages of this system include requiring the user to separately continue with the time-consuming separate steps of installation of any necessary application unlocking codes, as discussed above for example.

Therefore, in view of the prior art above, there is a need for dedicated software applications which prevent illegal copying from being useful and which can be downloaded directly to user stations such as a mobile station or a personal computer, via a network or via media, and which are immediately usable or executable only by that particular user station, such as a mobile station, without requiring the user to perform additional time-consuming and bothersome steps such as contacting the manufacturer for an unlocking code. There is also a need for eliminating contact between the manufacturer of application (or the manufacturer of the user stations) and the user when downloading or receiving new applications which is solved by having the user deal directly with a distributor such as an independent distributor who can provide services formally reserved for manufacturers only such as providing specific user stations codes. The invention envisions many potential distribution media and distribution structures for the applications including, but not limited to, wireless networks, magnetic or optical media, web-based www sites, .TAR files, .AOS files, personal computers, and smart cards.

SUMMARY OF THE INVENTION

According to the objects of the invention, the present invention ensures that an application downloaded or received from an application source is only useable by an authorized user station. During the download process the application is dedicated, i.e., specifically configured, to only be useable by the specific user station which is identifiable to the application source via an identification code. The present invention also includes a method for directly downloading the application to the user station from an independent distributor rather than from the manufacturer.

Therefore, according to a first aspect of the invention a method of downloading copy protected dedicated applications to a user station from an application source is disclosed comprising the steps of: sending an order for an application to an application source the order comprising at least an unique identification information which identifies the user station and the user of the user station to the application source; upon identification, preparing a dedicated application by configuring a general application accessible to the application source to include the unique identification information specific to the user station; and downloading the dedicated application directly to the user station. The invention may also include the further step of:

comparing the unique identification information to identify the user station to the application source by using a library of identification information accessible to the application source. The invention may also provide that before the step of downloading occurs, the steps occur of: saving the dedicated application to a location accessible by the user station and informing the user station that the dedicated application is ready to be downloaded to the user station from the location. The invention may also include that the identification information includes time and date of dedicated application download information. The invention may also include that the dedicated application is a setup application. The invention may also include that the step of identifying identifies the user station for billing purpose. The invention may also include that the steps of sending the order, and downloading the dedicated application, occur via a wireless network. The invention may also optionally include that the identification information is checked by the user station every time the dedicated application is run.

According to a second aspect of the invention a method of directly automatically downloading copy protected applications from a distributor to a user station from an application source without requiring contact between a user of the user station and a manufacturer of the application is disclosed comprising the steps of: sending a template version of an application from a manufacturer to a distributor, the template version including a variable of known value; ordering an application from the distributor including automatically identifying the user station via a code specific to the user station; upon placing the order, automatically replacing the variable with the code specific to the user station to make the application a dedicated application which is copy protected, and which will only run on the user station with a matching code; and automatically downloading the dedicated application to the user station. The invention may also include replacing the variable is performed by a binary patch method. The invention may also include that some or all of the steps are performed over a wireless network. The invention may also include that the step of ordering includes automatically checking the code against a library of authorization codes accessible to the distributor.

According to a third aspect of the invention, a system for ordering and downloading copy protected dedicated applications to a user station from an application source is disclosed, the system comprising: a user station that signals at least one unique identification code when placing an order; an application source responsive to the user station for receiving and checking the identification code for authentication purposes; an application including a variable set by a manufacturer of the application, said application responsive to: a command for substituting the identification code for the variable to create a dedicated application, to a command for sending the dedicated application to the user station, to a command for executing the dedicated application at the user station, and to a command for comparing and matching the identification code of the application to the identification code of the user station. The invention also discloses a library of identification codes accessible to the user station for providing comparison data to the user station when the user station checks the identification code signalled from the user station to the application source for authorization purposes. The invention also discloses a system of claim wherein the dedicated application has the additional optional feature of: whenever the dedicated application is executed the identification code is checked. The invention also discloses that the application source may be located remotely from the manufacturer of the application.

BEST MODE FOR CARRYING OUT THE INVENTION

Figure 1:
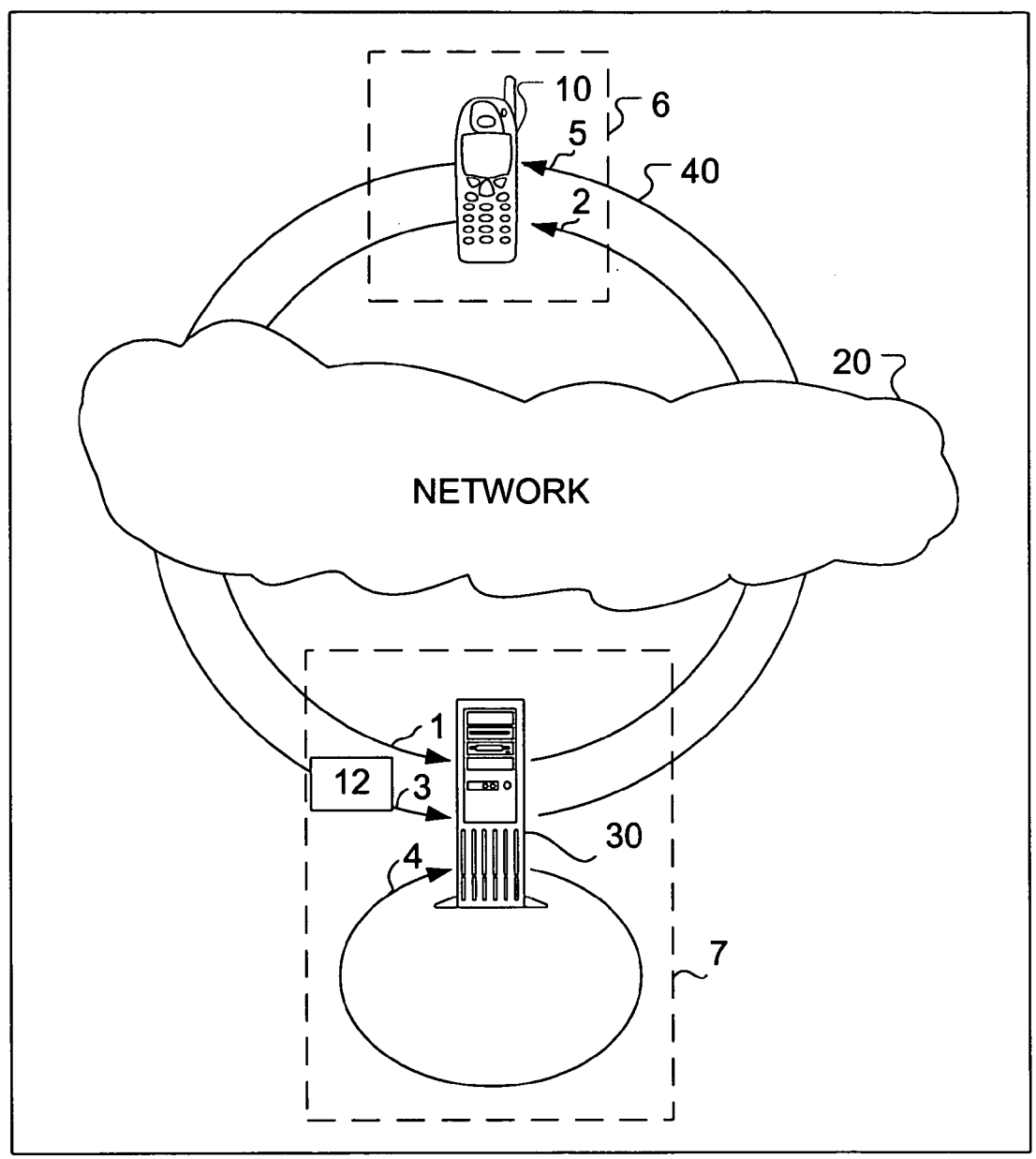
FIG. 1 shows a method of distributing a software application to a particular user station 6, in this case, a mobile station 10, according to the first aspect of the invention, in this case, in a network environment including the mobile station and an application source 7, which in this case is a server 30.

FIG. 1 shows a method of distributing an application to a particular user station according to the first aspect of the invention. It is understood that throughout this specification a user station 2 can be a mobile station, personal computer, a smart phone, or other communicator. The figure shows a user station as a mobile station 10, which uses a network 20 and an application source. It is understood that throughout this specification the application source can be a server in a network, a web based "www" site, an e-mail, a magnetic media such as a diskette, a memory card or other application medium. In this case the application source is a network server 30, and the mobile station 10 and server 30 communicate via network 20.

As seen in FIG. 1, the method of the preferred embodiment includes the following steps. First, the mobile station 10 signals to the server 30 via the network 20 that it wants to connect to the server 30 as shown by reference numeral 1. Second, the server 30 signals to the mobile station 10 that a connection has been opened to the server 30 as shown by reference numeral 2. Third, the mobile station 10 signals to the server 30 that is placing an order for a new application by providing its identification information in the form of an identification code 12 as represented by reference numeral 3. The server 30 checks the code to determine if the mobile station is an authorized mobile station and if the mobile station is authorized, the process proceeds to step four, although it is emphasized that this checking step is not an absolute requirement. Fourth, the server begins a dedication process 4 of the application to create a dedicated application 40 which is not useful if illegally copied because it includes identification code 12. Fifth, a dedicated application 40 is automatically downloaded to the mobile station 10 from the server 30 in an executable format as seen at reference numeral 5. Thus, an application stored in the server 30, or at least accessible to server 30, is configured by the server to be a dedicated application 40 and may be automatically delivered to the mobile station 10 at reference numeral 5. The dedicated application 40 will only function with the specific mobile station 10 which provides a matching identification code 12 specific to the mobile station 10. As a further optional step, the dedicated application 40 now residing in the mobile station 10 may continually check and match the identification code 12 every time the application is executed although it is emphasized that this continued against the code checking step is not an absolute requirement. In summary, the mobile station 10 is able to order and download or receive a newly created dedicated application 40 directly from the server 30 by providing unique identification information which is incorporated into the newly created dedicated application 40.

Figure 2:
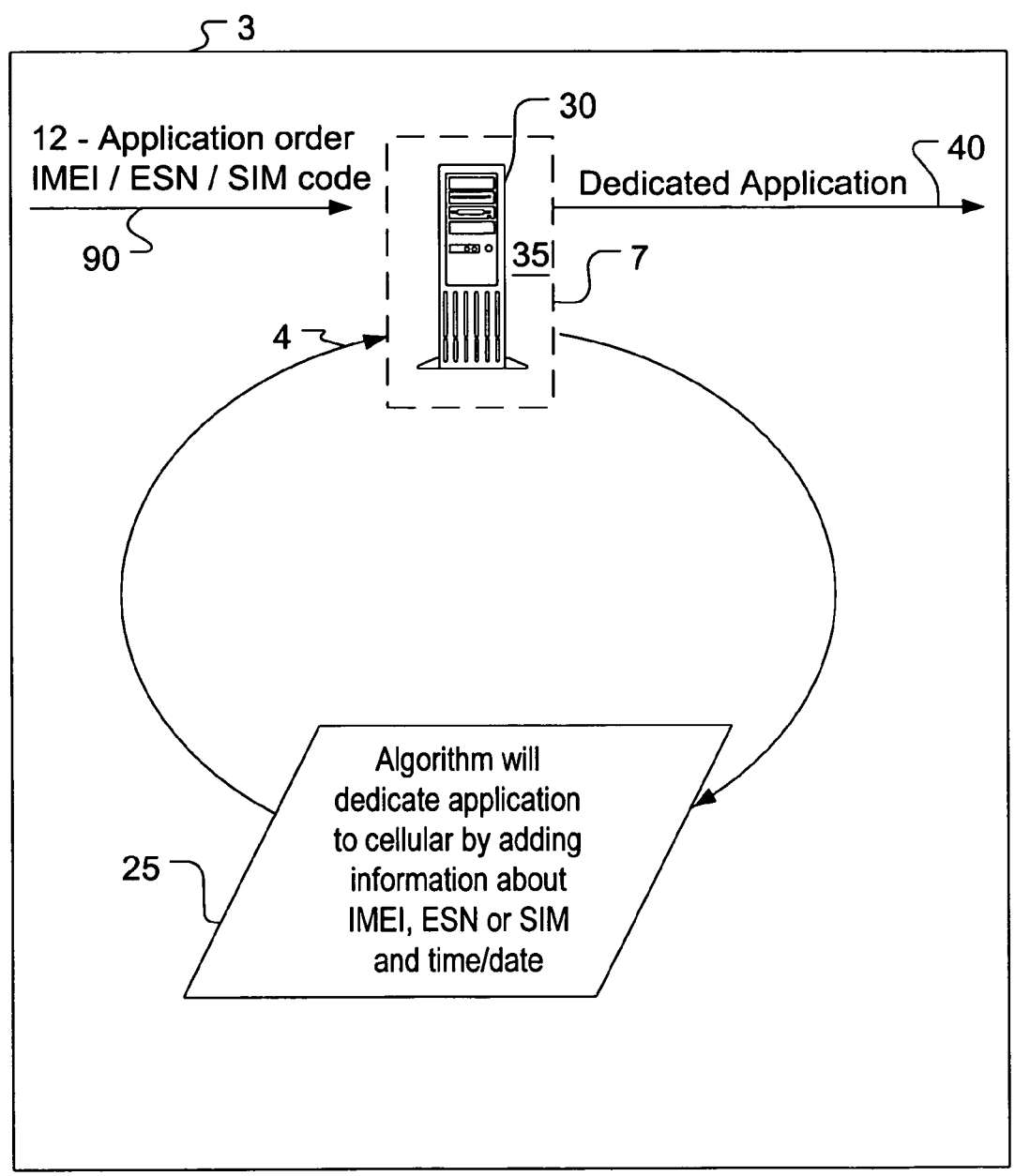
FIG. 2 is a diagram of a process for dedicating an application to a particular user station, in this case a mobile station.
Figure 4:
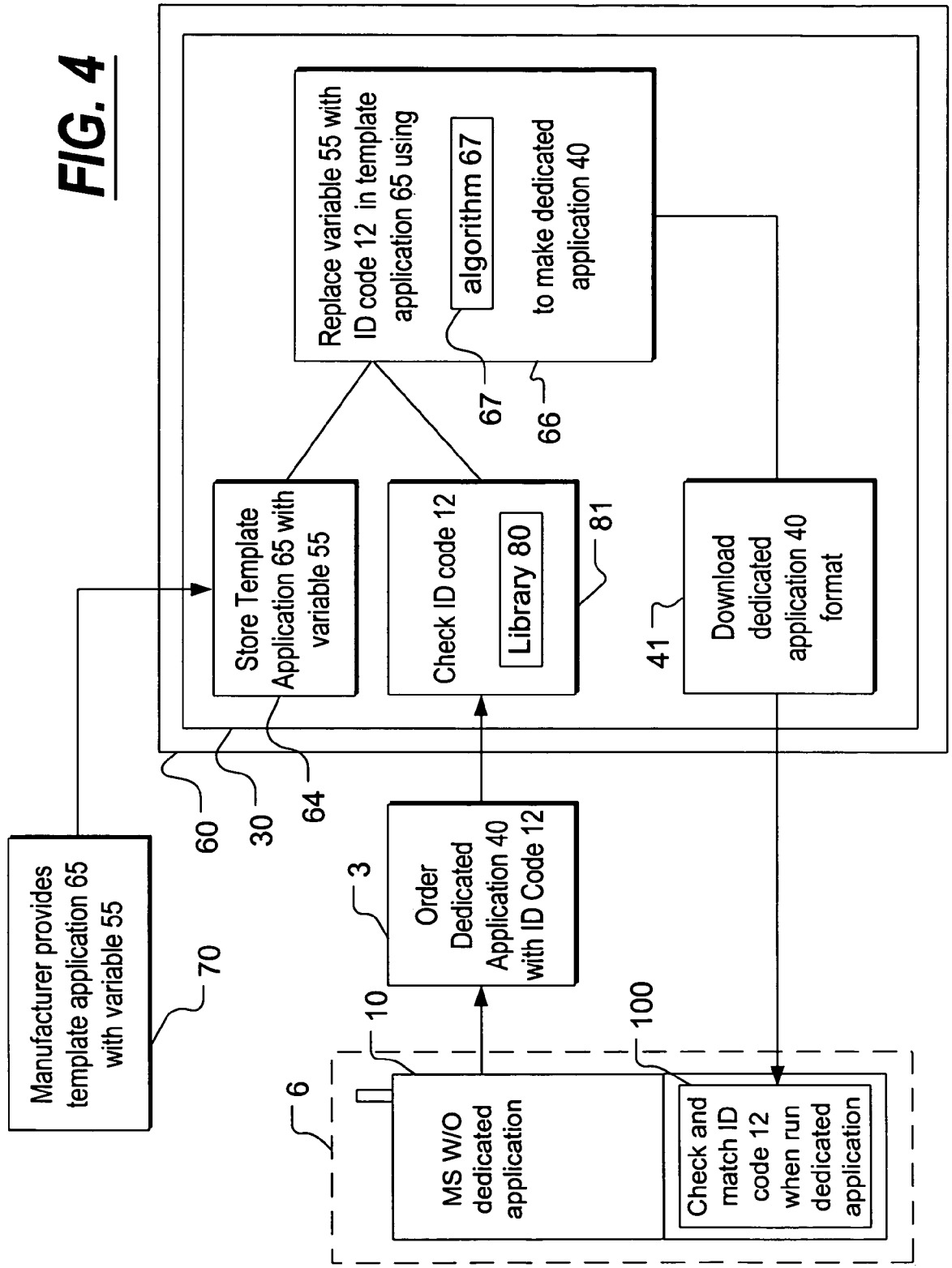
FIG. 4 is a block diagram of the preferred embodiment system for dedicating the application to the specific user station user.

FIG. 2 shows in greater detail the preferred embodiment method of dedicating an application to the specific mobile station 10 shown in FIG. 1. As previously described, it is assumed the mobile station 10 has placed an order 3 for an application with the server 30. The order 3 contains an identification code 12 for the mobile station 10 or for associated equipment such as a SIM card (not shown). The code may be formatted in many different formats. For example, the code may be, but is not limited to, an IMEI (International Mobile Station Equipment Identity) code, an ESN (Electronic Serial Number) code, or a SIM (Subscriber Identity Module) code. Once the order 3 is received by the server 30, and the identification code 12 is authorized via a standard authorization process (not shown), the server 30 begins dedicating the application 35 stored in the server 30, or at least accessible to the server 30 by using an algorithm 25 which adds the identification code 12 to the application 35. The identification code may also include information stating the time and date of placing the order 3 and/or the time of delivery or downloading. Once the application 35 has been configured to be a dedicated application 40 by the addition of identification code 12, the server 30 may send or download the dedicated application 40 to the mobile station 10 as seen in FIG. 1 at step 5. Optionally, as seen in FIG. 4, the mobile station 10 checks, at step 100, the identification code 12 in the dedicated application 40 by comparing it to the identification code 12 of the mobile station 10 when the dedicated application 40 is used or executed for the first time by the mobile station 10. An additional option is that the mobile station 10 may continually check the identification code 12 every time in the future the dedicated application 40 is run. Thus, the method enables dedicated applications 40 which are only useful to the particular mobile station 10. Therefore, if dedicated application 40 is somehow copied, it will not run on another mobile station. Thus, the dedicated application 40 is considered to include copy-protection measures.

Figure 3:
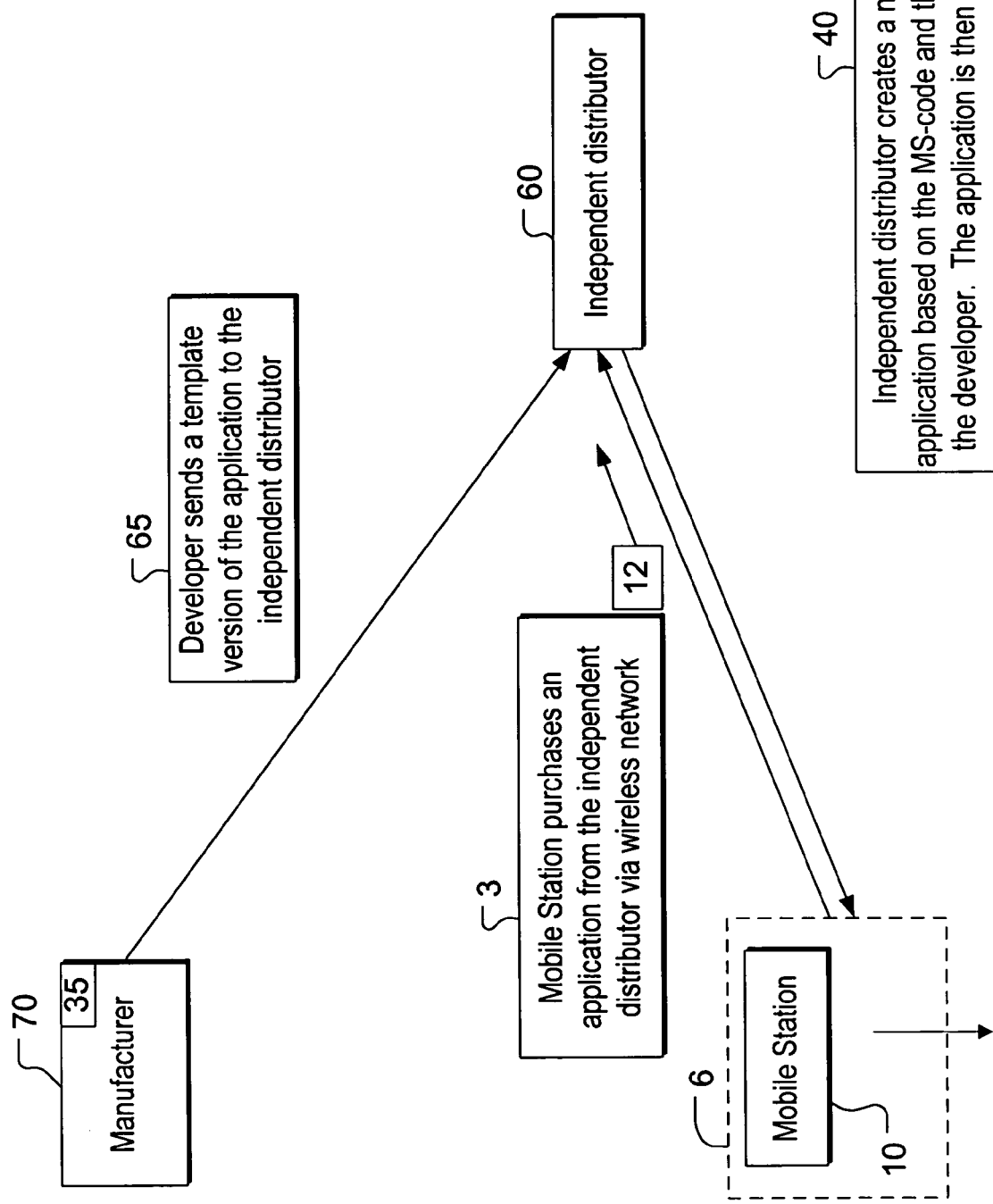
FIG. 3 is a block diagram of a process for directly downloading a dedicated application to a customer from an independent distributor, according to the second aspect of the invention.

FIG. 3 shows an additional method of the present invention wherein an independent distributor 60 distributes dedicated application 40 of the present invention to mobile station 10 without requiring mobile station 10 or its user (not shown) to contact the application manufacturer 70. In this method, first a manufacturer 70 develops the application 35. The application 35 is in a general template format. The independent distributor 60 is sent the template application 65 and awaits an order from mobile station 10 used by a customer. Thus, the mobile station 10 can order 3 a new dedicated application 40 by first signaling the independent distributor 60 via the wireless network 20 or via other application sources, as discussed above. When an order 3 is placed by the mobile station 10 with the independent distributor 60, the mobile station 10 transmits an identification code 12 to the distributor 60, which as discussed above in connection with step 3 of FIG. 1 may be one of various formats. The identification code 12 is examined by the independent distributor 60, and if it is a proper identification code 12, the independent distributor 60 authorizes the downloading of the dedicated application 40. Before doing so, however, the dedicated application 40 of the present invention is configured to be specific to the mobile station 10, or associated equipment such as a SIM card (not shown), by including the identification code 12 in the application 40. The identification code 12 replaces a variable 55 (see FIG. 4 at step 66) which was included with the template application 65 from the manufacturer 70. The identification code 12 may be inserted into the template 65 to replace the variable 55 by a binary patch method or other method. Once the template 65 is configured for the particular mobile station 10, the independent distributor 60 sends the dedicated application 40 of the present invention to the mobile station 10 whereupon the dedicated application 40 is automatically executable by the mobile station 10. This method enables the customer possessing the mobile station 10 to directly download a new application 35 which is configured to be a dedicated application 40 specific to the customer's mobile station 10. The dedicated application 40 is ready to use when it is received by the mobile station 10. An optional step of further checking of the identification code may be performed at step 100. Another additional step of checking may be executed by the mobile station 10 whenever the application is executed in the mobile station 10, as described in detail in below reference to FIG. 4. In this manner, the user of the mobile station 10 does not have to contact the original manufacturer 70 or experience any delay in running the dedicated application 40. This is because the entire process described above may be automated at the independent distributor 60 level or server 30 level.

FIG. 4 shows the method of FIG. 3 in more detail. FIG. 4 also shows the system of the third aspect of the invention. The manufacturer 70 provides a template application 65 with a variable 55 to the server 30. The server 30 may be located at the manufacturer 70 or at an independent distributor 60. In the preferred embodiment the server 30 is located at the independent distributor 60 which is the server 30. Therefore, in FIG. 4, the independent distributor 60 is shown to encompass the server 30 and is located remotely from manufacturer 70. Server 30 at step 64 stores template application 65 with variable 55 and awaits an order 3 from mobile station 10 for a dedicated application 40 (see FIG. 3). Mobile station 10 contacts server 30 and sends identification code 12 (see FIG. 3) to server 30. Server 30 includes a library 80 of codes which is optionally used to check at step 81 the identification code 12 for authentication purposes. Next, server 30 at step 66 replaces the variable 55 with the identification code 12 in the template application 65 at step 66 using an algorithm 67. This configures the template application 65 to become dedicated application 40. The dedicated application 40 is then downloaded to mobile station 10 directly at step 41. The downloaded application 40 is formatted to be ready to run by mobile station 10. Optionally, in the future, every time the mobile station 10 wants to use or execute the dedicated application 40, the mobile station 10 may optionally check and match its identification code 12 against the identification code of dedicated application 40. The dedicated application 40 is located in the mobile station 10 after downloading.

The invention also envisions that in any embodiment before a step of downloading or sending occurs, the steps occur of: saving the dedicated application to a location accessible by the user station and informing the user station that the dedicated application is ready to be downloaded to the user station from the location.

The invention also envisions that in any embodiment the step of ordering can be performed by, and from, any device, and not necessarily from the user station which will receive the dedicated application, so long as the identification information for the user station (for example an IMEI code) and or the user of the user station (for example, SIM code, phone number, name, social security number, credit card number, or other id information) is provided to the application source.

Therefore, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of downloading copy protected dedicated applications to a user station from an application source comprising the steps of:
    a) sending an order from a user station for an application to an application source, the order comprising at least a unique identification information in the form of an identification code of the user station equipment which identifies the particular user station equipment which the copy protected dedicated application is to be downloaded to and which identifies the user of the user station to the application source;
    b) upon identification of the particular user station equipment by the application source, preparing a dedicated executable application that can only run on the particular user station identified by configuring a general application accessible to the application source to include the unique identification information specific to the particular user station equipment identification code; and
    c) downloading the dedicated executable application from the application source directly to the particular user station identified wherein the downloaded dedicated executable application is copy protected by virtue of being configured by the application source to have the equipment identification code of the particular ordering user station to run only on the particular ordering user station and no other user station.

2. The method of claim 1 including the further step of:
    comparing the unique identification information in the order sent to the application source to identify the user station to the application source by using a library of identification information accessible to the application source for authentication purposes.

3. The method of claim 1 further including the step of including the time and date of placing the order for a dedicated executable application and the time and date of downloading the dedicated executable application in the unique identification information.

4. The method of claim 1 wherein:
    the dedicated application is a setup application.

5. The method of claim 1 wherein:
    the step of identifying identifies the user station for billing purposes.

6. The method of claim 1 wherein:
    the steps of sending the order, and downloading the dedicated executable application, occur via a wireless network.

7. The method as defined in claim 1 wherein the identification code of the user station equipment is an IMEI (International Mobile Station Equipment Identity) code.

8. The method as defined in claim 1 wherein the identification code of the user station equipment is an ESN (Electronic Serial Number) code.

9. The method as defined in claim 1 wherein the identification code of the user station equipment is a SIM (Subscriber Identity Module) code.

10. The method of claim 1 wherein:
    before the step of downloading occurs, the steps occur of: saving the dedicated executable application to a location accessible by the particular user station identified and informing the particular user station identified that the dedicated executable application configured to the particular user station identified is ready to be downloaded to the particular user station identified from the location.

11. The method of claim 10 wherein:
    the identification information is checked by the user station every time the dedicated executable application is run.

12. A method of directly automatically downloading copy protected applications from a distributor to a user station from an application source without requiring contact between a user of the user station and a manufacturer of the application comprising the steps of:
    a) the manufacturer sending a template version of an application from a manufacturer to a distributor, the template version including a variable of known value;
    b) ordering an application from the distributor including automatically identifying the user station to which the copy protected application is to be downloaded to via an information code specific to the identified user station equipment identification code;
    c) upon placing the order, automatically replacing the variable with the information code specific to the identified user station equipment identification code to make the application a dedicated executable application which is copy protected, and which dedicated executable application will only run on the a user station with a matching equipment information code; and d) automatically downloading the dedicated executable application to the user station having said matching equipment information code wherein the downloaded dedicated executable application is copy protected by virtue of the template version being configured by the distributor to have the equipment identification code of the identified user station to run only on the identified user station and no other user station.

13. The method of claim 12 wherein:

replacing the variable is performed by a binary patch method.

14. The method of claim 12 wherein:

the steps are performed over a wireless network.

15. The method of claim 12 wherein:

the step of ordering includes automatically checking the information code specific to the identified user station equipment identification code against a library of authorization codes accessible to the distributor.

16. A system for ordering and downloading copy protected dedicated applications to a user station from an application source, the system comprising:

a) a user station that signals at least one unique identification code when placing an order wherein said unique identification code identifies the particular user station equipment to which the copy protected dedicated application is to be downloaded to;

b) an application source responsive to the user station signaling the at least one unique identification code for receiving and checking the user station equipment identification code for authentication purposes;

c) an application including a variable set by a manufacturer of the application, said application responsive to:

(a) a command for substituting the particular user station equipment identification code for the variable to create a dedicated executable application that will only run on a user station having the matching equipment information code, (b) to a command for sending the dedicated executable application to the particular user station identified, (c) to a command for executing the dedicated application at the particular user station identified, and (d) to a command for comparing and matching the user station equipment identification code of the dedicated application to the particular user station equipment identification code of the user station to run the downloaded dedicated executable application wherein the downloaded dedicated executable application is copy protected by virtue of the manufacturer's application being configured to have the equipment identification code of the particular user station equipment to run only on the particular user station and no other user station.

17. The system of claim 16 further comprising:

a library of user station equipment identification codes accessible to the particular user station for providing comparison data to the particular user station when the particular user station checks the unique identification code signaled from the user station to the application source for authorization purposes.

18. The system of claim 16 wherein the dedicated application has the additional feature of:

whenever the dedicated application is executed the unique identification code is checked.

19. The system of claim 16 wherein:

the application source is located remotely from the manufacturer of the application.

* * * * *

UNITED STATES PATENT AND TRADEMARK OFFICE
CERTIFICATE OF CORRECTION

PATENT NO.       : 7,146,645 B1
APPLICATION NO. : 09/475359
DATED            : December 5, 2006
INVENTOR(S)      : Hellsten et al.

It is certified that error appears in the above-identified patent and that said Letters Patent is hereby corrected as shown below:

Title Page, Item (56) References Cited, please add the following:

FOREIGN PATENT DOCUMENTS

EP    851597    7/98
EP    778512    6/97
DE    4408544   9/95

Signed and Sealed this

First Day of January, 2008

JON W. DUDAS
*Director of the United States Patent and Trademark Office*